United States Patent [19]

George et al.

[11] 4,289,281

[45] Sep. 15, 1981

[54] APPARATUS FOR WINDING ARMATURES

[75] Inventors: Robert D. George; Robert C. Gray, both of Dayton, Ohio

[73] Assignee: Mechaneer, Inc., Dayton, Ohio

[21] Appl. No.: 90,991

[22] Filed: Nov. 5, 1979

[51] Int. Cl.$^3$ .......................................... H05K 15/09
[52] U.S. Cl. ................................. 242/7.05 B; 29/735; 29/597
[58] Field of Search ................ 29/735, 596, 597, 598; 140/92.1; 242/7.03, 7.05 R, 7.05 B, 7.05 C

[56] References Cited

U.S. PATENT DOCUMENTS

| | | | |
|---|---|---|---|
| 2,627,379 | 2/1953 | Moore | 242/7.05 B |
| 2,670,145 | 2/1954 | Biddison | 242/7.05 B |
| 3,713,598 | 1/1973 | Bucholtz et al. | 242/7.05 B |
| 3,857,172 | 12/1974 | George et al. | 29/597 |
| 3,892,366 | 7/1975 | Ott | 242/7.05 B |

Primary Examiner—Gil Weidenfeld
Assistant Examiner—K. J. Ramsey
Attorney, Agent, or Firm—Jacox & Meckstroth

[57] ABSTRACT

A double-flier armature winding machine includes a pair of opposing non-rotating winding chucks or forms for engaging the armature core. Each winding form is supported by a bearing mounted on a rotary flier assembly which is mounted on a shaft supported for both rotary and axial movement. Each winding form supports a wire deflector finger for pivotal movement in response to axial movement of an actuator carried by the flier assembly. While the flier assembly is rotating, each actuator is movable axially relative to its corresponding flier assembly by actuation of a fluid cylinder to insure engagement of a wire lead with a predetermined tang on the armature commutator.

13 Claims, 3 Drawing Figures

U.S. Patent
Sep. 15, 1981
4,289,281
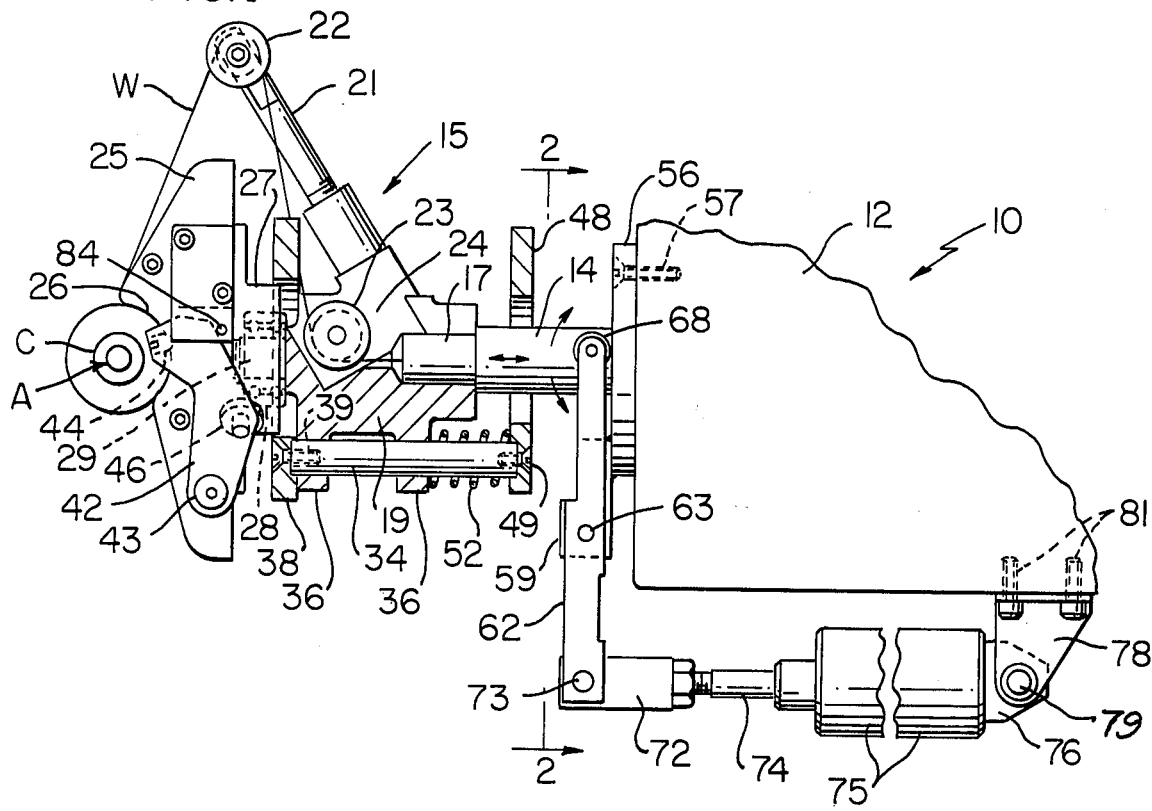
FIG.1
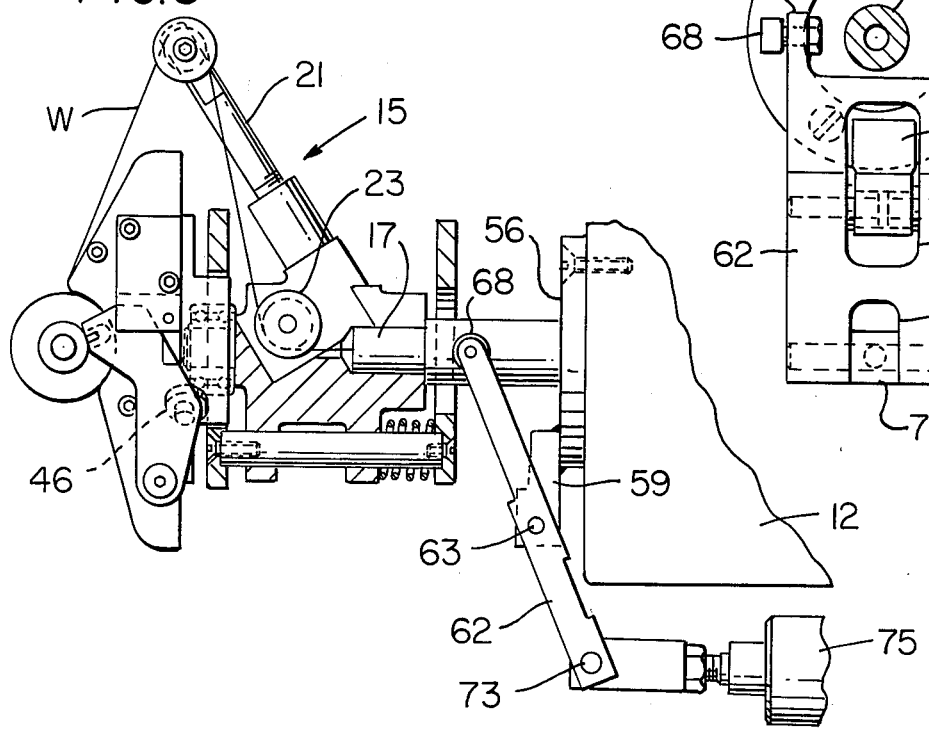
FIG.2
FIG.3

APPARATUS FOR WINDING ARMATURES

BACKGROUND OF THE INVENTION

In an automatic armature winding machine such as the doubleflier type winding machine disclosed in George et al, U.S. Pat. No. 3,857,172 which issued to the Assignee of the present invention, it is common to wind armatures having commutator bars with hooks or tangs around which lead wires are wrapped after coils are wound in the slots of the armature core. When such a machine is used for winding certain types of armatures, for example, automotive armatures which require a relative heavy gauge wire, each lead wire is connected after the winding of a coil to a commutator tang which is usually within the span of the coil so that the wire is not wrapped substantially around the armature shaft in the area between the commutator and the core.

In order to assure that the wire extending from a wound coil to the flier connects with the proper commutator tang, a wire deflector member or finger is pivotally mounted on each of the winding chucks or forms which grip the core, for example, as disclosed in U.S. Pat. No. 3,713,598. As illustrated in FIGS. 7 and 8 of this patent, the wire deflector fingers are pivoted or actuated by corresponding vertical pins located under the winding forms. The actuating pins are elevated vertically to engage corresponding slides within the forms when it is desired to pivot the fingers inwardly to deflect the lead wires around the appropriate commutator tangs, and the deflector fingers pivot outwardly away from the commutator when the vertical actuating pins are retracted downwardly.

As apparent from the disclosure of U.S. Pat. No. 3,713,598, when the vertical actuating pins are elevated to pivot the wire deflector fingers, the support for the pins projects into the path of the rotary fliers, thus requiring that the fliers be stopped in precise predetermined positions before the actuating pins are elevated. The precise stopping of the fliers requires a more complex control system and may increase the total time required for the winding operation. In addition, the mechanism for actuating the wire deflector fingers is relatively complex and must be built into the winding forms which are selected according to the size of the armatures being wound. In addition, pieces of scrap wire, which are produced at the winding station, may lodge within the actuating mechanism for the deflector fingers and prevent dependable operation.

SUMMARY OF THE INVENTION

The present invention is directed to a machine or apparatus for automatically and successively winding a supply of unwound armatures and which incorporates an improved mechanism for actuating wire deflector fingers supported by the coil winding forms. The improved actuating mechanism of the invention overcomes all of the problems mentioned above in connection with previously known actuating mechanisms used on armature winding machines and, in addition, provides for increasing the speed of the winding operation as well as a more dependable winding operation.

In general, the desirable features and advantages of the invention are provided by actuating the wire deflector fingers with mechanisms carried by the corresponding flier assemblies and which are adapted to be power actuated while the fliers are rotating. The deflector finger actuating mechanisms also provide for retracting the winding forms when it is desired to insert an unwound armature or to remove a wound armature.

BRIEF DESCRIPTION OF THE DRAWING

FIG. 1 is a fragmentary elevational view, in part section, of one-half of a double-flier armature winding machine and illustrating a wire deflector finger and its actuating mechanism constructed in accordance with the invention;

FIG. 2 is a fragmentary section taken generally on the line 2—2 of FIG. 1; and

FIG. 3 is a part-sectional elevational view similar to FIG. 1 and illustrating the wire deflector finger and its actuating mechanism in positions for deflecting a lead wire around a commutator tang.

DESCRIPTION OF THE PREFERRED EMBODIMENT

FIG. 1 illustrates one side or head portion of an automatic armature winding machine 10 of the double-flier type generally disclosed in above-mentioned George et al U.S. Pat. No. 3,857,172. The machine includes a frame or housing having two opposing head portions 12. A tubular shaft 14 projects outwardly from each head portion 12 and is supported for reversing rotation as well as axial movement according to the operation of the shaft drive mechanism located within the housing. Since both of the opposing and axially aligned shafts 14 of the winding machine support identical or corresponding components constructed in accordance with the invention, only one assembly of the components will be described in detail, it being understood that the assembly is duplicated for the opposing shaft 14.

A flier assembly 15 is rigidly mounted on a reduced end portion 17 of the shaft 14 so that the flier assembly rotates with the shaft and also moves axially with the shaft, as indicated by the arrows in FIG. 1. The flier assembly 15 includes a cast metal hub portion 19 which supports an elongated flier arm 21 projecting outwardly from the hub portion 19 and forming an acute angle with the axis of the shaft 14. A wire guide roller or wheel 22 is supported by the outer end portion of the arm 21, and a similar wire guide wheel 23 is supported within a slot 24 formed within the hub portion 19 to direct a wire W supplied through the center of the shaft 14 from a suitable supply coil (not shown).

In a convention manner, the wire W is used for successively winding coils within an armature A which includes a commutator C having hook-like tangs connected to the coils by lead wires wrapped around the tangs before and after each of the successively wound coils. The armature A is held in position at the winding station by a pair of opposing winding chucks or forms 25 each having a part-cylindrical surface 26 which mates with the outer cylindrical surface of the slotted armature core. Each of the winding forms 25 includes a hub portion 27 which retains an anti-friction bearing 28 mounted on a cylindrical extension 29 of the flier hub portion 19. Thus in a conventional manner, the winding form 25 is supported for axial movement with the shaft 14 and the flier assembly 15, but does not rotate when the shaft 14 and flier assembly 15 are rotated both in a forward direction and a reverse direction.

In accordance with the present invention, a set of three uniformly spaced parallel actuating rods 34 are supported by the flier hub portion 19 for axial sliding movement relative to the hub portion. Each of the rods 34 extends through axially aligned holes formed within a set of ear portions 36 formed as an integral part of the flier hub portion 19. An annular actuating plate 38 is mounted on the outer end portions of the rods 34 and is secured to the three rods by a set of screws 39. The plate 38 has an inner diameter slightly greater than the outer diameter of the hub portion 27 of the winding form 25.

A wire deflector member or finger 42 is pivotally supported adjacent the front surface of the winding form 25 by a pivot screw 43, and the deflector finger 42 has a cavity or recess 44 which is adapted to receive a commutator tang in a manner similar to that disclosed in above-mentioned U.S. Pat. No. 3,713,598. The deflector finger 42 carries a roller 46 which is adapted to engage the outer or adjacent radial face of the annular actuating plate 38.

A second annular actuating plate 48 is mounted on the inner end portions of the three actuating rods 34 by a set of screws 49 and surrounds the shaft 14 between the flier hub portion 19 and the housing head portion 12. A set of three compression coil springs 52 are mounted on the actuating rods 34 between the actuating plate 48 and the corresponding ears 36 and normally bias or urge the assembly of the actuating rods 34 and plates 38 and 48 toward a retracted position as shown in FIG. 1.

A bracket 56 is mounted on the housing head portion 12 in surrounding relation to the shaft 14 and is secured by a set of screws 57. The bracket 56 includes a portion 59 which projects outwardly into an opening 61 formed within a lever 62, and a cross-pin 63 supports the lever 62 for pivotal or tilting movement. The upper end portion of the lever 62 is formed by a pair of spaced ears 66 defining a yoke configuration, and each of the ears 66 supports a freely rotatable roller 68.

A slot 71 is formed within the lower portion of the lever 62 and receives a fitting 72 which is pivotally connected to the lever 62 by a cross-pin 73. The fitting 72 is threaded onto the outer end portion of a piston rod 74 forming part of a fluid or air actuating cylinder 75. The cylinder 75 includes a rearwardly projecting ear 76 which is pivotally connected to a U-shaped support bracket 78 by a pivot pin 79, and the bracket 78 is secured to the housing head portion 12 by a set of screws 81.

In operation of the deflector finger actuating mechanism described in connection with FIGS. 1 and 2, the deflector finger 42 is normally in a retracted position (FIG. 1) where the finger engages a stop pin 84 under the bias of a torsion coil spring (not shown) mounted on the pivot screw 43. When it is desired to shift or pivot the deflector finger 42 inwardly to guide or deflect the wire W around a commutator tang, the cylinder 75 is actuated to retract the rod 74 and pivot the lever 62 counterclockwise (FIG. 3). The rollers 68 on the lever 62 engage the actuating plate 48 and press the plates 48 and 38 outwardly compressing the springs 52. The forward actuating plate 38 engages the roller 46 on the deflector finger 42 and pivots the finger to its extended or wire deflecting position as shown in FIG. 3. When the cylinder 75 is actuated to extend the rod 74 and return the lever 72 to its normally retracted position (FIG. 1), the actuating rods 34 and plates 38 and 48 return to their normally retracted position (FIG. 1) thus permitting the deflector finger to return to its retracted position, as shown in FIG. 1.

From the drawing and the above description, it is apparent than an armature winding machine incorporating a deflector finger or member actuating mechanism constructed in accordance with the present invention, provides desirable features and advantages. For example, it is apparent from the drawings that the actuating mechanism is never within the path of the flier arm 21 and thus may be actuated independently of the rotation of the arm. As a result, it is not necessary to stop the arm 21 in a precise predetermined position before the deflector finger is moved to a wire deflecting position, thereby increasing the speed of the winding operation. The actuating mechanism is also simple and dependable in operation and is not exposed to any pieces of scrap wire which drop from the winding station when the lead wires are cut near the commutator tangs.

While the form of armature winding apparatus herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. In apparatus for automatically winding coils of wire on an armature core mounted on a shaft supporting a commutator and for connecting wire leads to the commutator, said apparatus including a rotary shaft, a winding form member positioned adjacent the armature core, a flier assembly supported for rotation with said shaft and relative to said form member, and a movable wire deflector member associated with said form member, the improvement comprising a deflector member actuator carried by said flier assembly for rotation therewith and movable in an axial direction relative to said shaft, and means for moving said actuator in said axial direction while said flier assembly is rotating to effect movement of said wire deflector member relative to said form member.

2. Apparatus as defined in claim 1 wherein said deflector member actuator includes a plurality of axially extending rods, and said flier assembly having means supporting said rods for axial movement relative to said flier assembly.

3. Apparatus as defined in claim 2 wherein said actuator further includes a set of plates mounted on opposite corresponding end portions of said rods, one of said plates being positioned to move said wire deflector member, and power activated means disposed for engaging the other said plate.

4. Apparatus as defined in claim 3 wherein said power activated means comprise a lever supported for pivotal movement and having means for engaging said other plate, and a power operated unit connected to pivot said lever.

5. Apparatus as defined in claim 2 wherein said wire deflector member comprises a finger pivotally connected to said form member, an annular activating plate mounted on corresponding end portions of said rods, and means on said finger for engaging said plate.

6. Apparatus as defined in claim 5 wherein said means on said finger for engaging said plate comprise a roller disposed to contact a radial face of said annular plate.

7. In apparatus for automatically winding coils of wire on an armature core mounted on a shaft supporting a commutator having hook-shaped tangs and for connecting wire leads to the commutator tangs, said apparatus including a shaft supported for both rotary and axial movement, a flier assembly mounted on said shaft for movement therewith and including an arm supporting a wire guide roller, a nonrotating winding form member supported by said flier assembly for axial movement therewith and adapted to grip an armature core, and a movable wire lead deflector member supported by said form member, the improvement comprising a deflector member actuator carried by said flier assembly for rotation therewith and movable in an axial direction relative to said flier assembly and said shaft, said actuator including means for engaging said deflector member on said form member, and power operated means for moving said actuator in an axial direction while said flier assembly is rotating to effect movement of said wire lead deflector member relative to said form member.

8. Apparatus as defined in claim 1 wherein said deflector member actuator includes a plurality of axially extending rods, said flier assembly inlcuding a hub portion supporting said rods for axial movement relative to said flier assembly, and annular means connecting said rods to effect movement as a unit.

9. Apparatus as defined in claim 8 wherein said annular means comprise a set of parallel annular plates mounted on opposite corresponding end portions of said rods, one of said plates being positioned adjacent said form member to move said wire deflector member, and the other said plate surrounding said shaft.

10. Apparatus as defined in claim 9 wherein said power operated means comprise a lever member supported for pivotal movement, and roller means mounted on said lever for engaging the other said plate of said actuator.

11. Apparatus as defined in claim 7 and including spring means biasing said actuator to a normally retracted position with said wire lead deflector member retracted from the commutator tangs.

12. Apparatus as defined in claim 7 wherein two of said shafts are disposed in opposing relation and support corresponding said flier assemblies and opposing winding form members, one said deflector member being pivotally supported by each of said form members, one of said actuator being carried by each of said flier assemblies, and corresponding separate said power operated means being provided for simultaneously moving said actuators.

13. In apparatus for automatically winding coils of wire on an armature core mounted on a shaft supporting a commutator having hooklike tangs to which wire leads extending from the coils are attached to the commutator, said apparatus including a shaft supported for rotation and axial movement, a flier assembly mounted on said shaft for rotation and axial movement therewith and including an outwardly projecting arm supporting a wire guide member, a non-rotating winding form member supported by said flier assembly for axial movement with said shaft and said flier assembly to effect gripping and releasing of the armature core, and a wire deflector member supported for pivotal movement by said form member, the improvement comprising an actuator carried by said flier assembly for rotation therewith and movable in an axial direction relative to said shaft and said flier assembly, means for pivoting said wire deflector member in response to axial movement of said actuator, and non-rotating power operated means for moving said actuator axially relative to said flier assembly while said flier assembly is rotating to effect pivoting of said wire deflector member relative to said form member during the winding operation.

* * * * *